(12) United States Patent
Bai et al.

(10) Patent No.: US 11,197,058 B2
(45) Date of Patent: Dec. 7, 2021

(54) SYSTEM AND METHOD FOR PRESENTING A VIDEO VIA TRANSCODE

(71) Applicant: SZ DJI TECHNOLOGY CO., LTD., Shenzhen (CN)

(72) Inventors: Gaoping Bai, Shenzhen (CN); Taiwen Liang, Shenzhen (CN); Wenhui Zhong, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 359 days.

(21) Appl. No.: 16/183,422

(22) Filed: Nov. 7, 2018

(65) Prior Publication Data
US 2019/0075357 A1 Mar. 7, 2019

Related U.S. Application Data

(63) Continuation of application No. PCT/CN2016/082045, filed on May 13, 2016.

(51) Int. Cl.
| | |
|---|---|
| *H04N 7/18* | (2006.01) |
| *H04N 21/4402* | (2011.01) |
| *H04N 5/225* | (2006.01) |
| *H04N 19/40* | (2014.01) |
| *H04N 21/414* | (2011.01) |
| *H04N 19/136* | (2014.01) |
| *H04L 29/06* | (2006.01) |

(52) U.S. Cl.
CPC ... *H04N 21/440263* (2013.01); *H04N 5/2257* (2013.01); *H04N 7/185* (2013.01); *H04N 19/40* (2014.11); *H04N 21/41407* (2013.01); *H04N 21/440236* (2013.01); *H04N 21/440281* (2013.01); *H04L 69/04* (2013.01); *H04N 7/18* (2013.01); *H04N 19/136* (2014.11)

(58) Field of Classification Search
None
See application file for complete search history.

(56) References Cited

U.S. PATENT DOCUMENTS

| | | | |
|---|---|---|---|
| 7,460,148 B1 * | 12/2008 | Clark | H04N 7/183 340/539.13 |
| 2007/0229680 A1 | 10/2007 | Kinney | |

(Continued)

FOREIGN PATENT DOCUMENTS

| | | |
|---|---|---|
| CN | 1538696 A | 10/2004 |
| CN | 101448152 A | 6/2009 |

(Continued)

OTHER PUBLICATIONS

The World Intellectual Property Organization (WIPO) International Search Report and Written Opinion for PCT/CN2016/082045 dated Jan. 26, 2017 9 pages.

(Continued)

*Primary Examiner* — Eileen M Adams
(74) *Attorney, Agent, or Firm* — Anova Law Group, PLLC

(57) ABSTRACT

A method for handling video includes extracting video content and context information from a video file. The context information is associated with the video content. The method further includes transmitting the video content via a first communication path and transmitting the context information via a second communication path separate from the first communication path.

17 Claims, 10 Drawing Sheets

(56) References Cited

U.S. PATENT DOCUMENTS

| | | | | |
|---|---|---|---|---|
| 2012/0266201 A1* | 10/2012 | Kanojia | ............. | H04N 21/2187 725/109 |
| 2013/0162822 A1* | 6/2013 | Lee | ........................ | H04N 7/185 348/146 |
| 2014/0282658 A1* | 9/2014 | Sinha | ................... | H04N 21/858 725/14 |
| 2015/0372820 A1* | 12/2015 | Schneider | .......... | H04N 21/4355 380/42 |

FOREIGN PATENT DOCUMENTS

| | | | |
|---|---|---|---|
| CN | 101778285 | A | 7/2010 |
| CN | 102342066 | A | 2/2012 |
| CN | 102484712 | A | 5/2012 |
| CN | 103475856 | A | 12/2013 |
| CN | 103596065 | A | 2/2014 |
| CN | 104219500 | A | 12/2014 |
| CN | 104639914 | A | 5/2015 |
| CN | 204515536 | U | 7/2015 |
| CN | 105120136 | A | 12/2015 |
| CN | 105242686 | A | 1/2016 |
| CN | 105532008 | A | 4/2016 |

OTHER PUBLICATIONS

Ruifang Pan, "Research on Pan-animation Creativity and Talent Cultivation", Oct. 31, 2010. pp. 132-139.

\* cited by examiner

SYSTEM AND METHOD FOR PRESENTING A VIDEO VIA TRANSCODE

CROSS-REFERENCE TO RELATED APPLICATION

This application is a continuation of International Application No. PCT/CN2016/082045, filed on May 13, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to imaging systems and more particularly, but not exclusively, to systems and methods for presenting a video via a remote device.

BACKGROUND

Currently-available remote video presenting methods demand for sophisticated hardware configuration to support real-time decoding, which results in high cost for implementing these methods with cameras. In addition, a decoded YUV bitrate requires high bandwidth and thus is inconvenient to transmit and store.

In view of the foregoing reasons, there is a need for a system and method for presenting a video clip via a remote device via a wireless connection with low cost.

SUMMARY

In accordance with a first aspect disclosed herein, there is set forth a method for supporting remote presenting, comprising:
  acquiring a video clip by an imaging processor; and
  transcoding video content of the video clip to present the video clip via a remote device.

In an exemplary embodiment of the disclosed methods, acquiring the video clip comprises loading a video file including the video clip from a storage medium.

In another exemplary embodiment of the disclosed methods, acquiring the video clip comprises extracting the video content from the video clip.

In another exemplary embodiment of the disclosed methods, transcoding comprises decoding the video content of the video clip to generate a first video bitstream.

In another exemplary embodiment of the disclosed methods, transcoding comprises downscaling the first video bitstream to generate a second video bitstream.

In another exemplary embodiment of the disclosed methods, downscaling the first video bitstream comprises reducing a bitrate of the first video bitstream to generate the second video bitstream.

In another exemplary embodiment of the disclosed methods, reducing the bitrate comprises reducing a resolution of the video content.

In another exemplary embodiment of the disclosed methods, reducing the bitrate comprises reducing a frame per second rate of the video content.

In another exemplary embodiment of the disclosed methods, transcoding comprises encoding the second video bitstream to generate a third video bitstream.

In another exemplary embodiment of the disclosed methods, encoding comprises encoding the second video bitstream with a protocol that is recognizable to an application ("APP") of the remote device.

Exemplary embodiments of the disclosed methods further comprise transmitting the third video bitstream for merging a context information of the video clip.

Exemplary embodiments of the disclosed methods further comprise transmitting the context information for merging with the third video bitstream.

In another exemplary embodiment of the disclosed methods, transmitting the context information comprises decoding the context information of the video clip to generate a first context bitstream.

In another exemplary embodiment of the disclosed methods, transmitting the context information comprises generating an auxiliary context bitstream based on the first context bitstream.

In another exemplary embodiment of the disclosed methods, transmitting comprises transcoding the first context bitstream.

In another exemplary embodiment of the disclosed methods, transcoding the context information comprises downscaling the first context bitstream to generate a second context bitstream.

In another exemplary embodiment of the disclosed methods, downscaling the first context bitstream comprises reducing a sampling rate of the first context bitstream and/or a bit per second rate of the first context bitstream.

In another exemplary embodiment of the disclosed methods, transcoding comprises encoding the second context bitstream to generate an auxiliary context bitstream.

Exemplary embodiments of the disclosed methods further comprise merging the third video bitstream and the auxiliary context bitstream to generate a composite bitstream for transmitting.

In another exemplary embodiment of the disclosed methods, merging comprises synchronizing the third video bitstream and the auxiliary context bitstream in the composite bitstream.

In another exemplary embodiment of the disclosed methods, acquiring the video clip and/or the transcoding the video content of the video clip are executed when the imaging processor is not capturing images.

Exemplary embodiments of the disclosed methods further comprise transmitting the composite bitstream via a selected transmission medium.

In another exemplary embodiment of the disclosed methods, transmitting the composite bitstream comprises transmitting the composite bitstream via a Universal Serial Bus ("USB") and/or a Media Interface ("MI") port.

In another exemplary embodiment of the disclosed methods, transmitting the composite bitstream comprises transmitting the composite bitstream to a remote device running an application ("APP").

In another exemplary embodiment of the disclosed methods, transmitting the composite bitstream comprises transmitting the composite bitstream via a wireless communication connection and/or a wired communication connection.

In another exemplary embodiment of the disclosed methods, presenting comprises presenting the composite bitstream via the remote device.

In another exemplary embodiment of the disclosed methods, presenting the composite bitstream comprises presenting the composite bitstream in a fast-forward mode or a fast-rewind mode.

Exemplary embodiments of the disclosed methods further comprise updating one or more configuration parameters of the imaging processor based on the presenting.

In another exemplary embodiment of the disclosed methods, the imaging processor is associated with an imaging device that is positioned on an unmanned aerial vehicle ("UAV").

In accordance with another aspect disclosed herein, there is set forth a computer program product, including instructions for supporting a remote device, being configured to perform the transmission process in accordance with any one of previous embodiments of the disclosed methods.

In accordance with another aspect disclosed herein, there is set forth a system for configuring an aerial imaging device, comprising:

an imaging device that operates to:

capture a video file for storing into a storage medium; and transmit the video file from the storage medium via transcoding; and a remote device that operates to:

receive content of the video file being transmitted; and adjust a configuration of the aerial imaging device based on the received content.

In accordance with another aspect disclosed herein, there is set forth an imaging system for supporting remote presenting, comprising:

an imaging processor that operates to:

acquire a video clip; and transcode video content of the video clip to present the video clip via the remote device.

Exemplary embodiments of the disclosed systems further comprise a storage media for storing the video clip as a video file.

In an exemplary embodiment of the disclosed systems, the imaging processor is configured to extract the video content from the video clip.

In another exemplary embodiment of the disclosed systems, the imaging processor is configured to decode the video content of the video clip to generate a first video bitstream.

In another exemplary embodiment of the disclosed systems, the video clip is transcoded by downscaling the first video bitstream to generate a second video bitstream.

In another exemplary embodiment of the disclosed systems, the video content is downscaled by reducing a bitrate of the first video bitstream to generate the second video bitstream.

In another exemplary embodiment of the disclosed systems, the bitrate of the first video bitstream is reduced by reducing a resolution of the video content.

In another exemplary embodiment of the disclosed systems, the bitrate of the first video bitstream is reduced by reducing a frame per second rate of the video content.

In another exemplary embodiment of the disclosed systems, the imaging processor is configured to encode the second video bitstream to generate a third video bitstream.

In another exemplary embodiment of the disclosed systems, the second video bitstream is encoded with a protocol that is recognizable to an application ("APP") of the remote device.

In another exemplary embodiment of the disclosed systems, the imaging processor is configured to transmit the third video bitstream for merging a context information of the video clip.

In another exemplary embodiment of the disclosed systems, the imaging processor is configured to transmit the context information for merging with the third video bitstream.

In another exemplary embodiment of the disclosed systems, the imaging processor is configured to decode the context information of the video clip to generate a first context bitstream.

In another exemplary embodiment of the disclosed systems, the imaging processor is configured to generate an auxiliary context bitstream based on the first context bitstream.

In another exemplary embodiment of the disclosed systems, the imaging processor is configured to transcode the context information by downscaling the first context bitstream to generate a second context bitstream.

In another exemplary embodiment of the disclosed systems, the context bitstream is downscaled by reducing a sampling rate of the first context bitstream and/or a bit per second rate of the first context bitstream.

In another exemplary embodiment of the disclosed systems, the imaging processor is configured to encode the second context bitstream to generate the auxiliary context bitstream In another exemplary embodiment of the disclosed systems, the imaging processor is configured to transmit the auxiliary context bitstream for merging the third video bitstream.

In another exemplary embodiment of the disclosed systems, the imaging processor is configured to merge the third video bitstream and the auxiliary context bitstream to generate a composite bitstream.

In another exemplary embodiment of the disclosed systems, the imaging processor is configured to synchronize the third video bitstream and the second context bitstream in the composite bitstream.

In another exemplary embodiment of the disclosed systems, the imaging processor is configured to acquire and/or transcode the video content of the video clip when the imaging device is not capturing images.

In another exemplary embodiment of the disclosed systems, the imaging processor is configured to transmit the composite bitstream via a transmission medium.

In another exemplary embodiment of the disclosed systems, the transmission medium transmits the composite bitstream via a Universal Serial Bus ("USB") and/or a Media Interface ("MI") port.

In another exemplary embodiment of the disclosed systems, the transmission medium is configured to transmit the composite bitstream to the remote device running an application ("APP").

In another exemplary embodiment of the disclosed systems, the transmission medium is a wireless connection or a wired connection.

Exemplary embodiments of the disclosed systems further comprise the remote device configured to present the composite bitstream via the APP.

In another exemplary embodiment of the disclosed systems, the remote device is configured to present the composite bitstream in a fast-forward mode or a fast-rewind mode.

In another exemplary embodiment of the disclosed systems, the remote device is configured to update one or more configuration parameters of the imaging processor based on the context information contained in the composite bitstream.

In another exemplary embodiment of the disclosed systems, the imaging processor and/or the storage medium is positioned on an Unmanned Aerial Vehicle ("UAV").

In accordance with another aspect disclosed herein, there is set forth a method for handling a video for a remote device, comprising:

transmitting video content of the video via a first communication path, and transmitting context information of the video via a second communication path being separate from the first communication path.

In an exemplary embodiment of the disclosed methods, transmitting the context information comprises transmitting the context information being associated with the video content.

Exemplary embodiments of the disclosed methods further comprise acquiring a video file including the video content from a storage device.

In another exemplary embodiment of the disclosed methods, acquiring comprises loading the video file from the storage medium to an imaging processor.

Exemplary embodiments of the disclosed systems further comprise extracting the context information of the video file.

In another exemplary embodiment of the disclosed methods, extracting the context information comprises extracting audio data, caption data, environmental data and/or configuration data.

In another exemplary embodiment of the disclosed methods, transmitting the context information comprises generating an auxiliary context bitstream based on the context information.

In another exemplary embodiment of the disclosed methods, transmitting the context information comprises transcoding the context information.

In another exemplary embodiment of the disclosed methods, transcoding the context information comprises decoding the context information to generate a first context bitstream.

In another exemplary embodiment of the disclosed methods, transcoding the context information further comprises downscaling the first context bitstream to generate a second context bitstream.

In another exemplary embodiment of the disclosed methods, downscaling the first context bitstream comprises reducing a bitrate of the first context bitstream.

In another exemplary embodiment of the disclosed methods, reducing the bitrate comprises reducing a bit per second rate of the second context bitstream.

In another exemplary embodiment of the disclosed methods, reducing the bitrate comprises reducing a sampling rate of the second context bitstream.

In another exemplary embodiment of the disclosed methods, transcoding comprises encoding the second context bitstream to generate an auxiliary context bitstream.

In another exemplary embodiment of the disclosed methods, encoding comprises encoding the second context bitstream with a protocol that compresses the bitstream.

In another exemplary embodiment of the disclosed methods, encoding comprises encoding with a protocol that is recognized by an application ("APP") of the remote device to generate the auxiliary context bitstream.

In another exemplary embodiment of the disclosed methods, transmitting the video content comprises extracting a video content from the video file.

In another exemplary embodiment of the disclosed methods, transmitting the video content further comprises transcoding the video content to generate an encoded video bitstream.

Exemplary embodiments of the disclosed methods further comprise merging the encoded video bitstream with the auxiliary context bitstream to generate a composite bitstream.

In another exemplary embodiment of the disclosed methods, merging comprises synchronizing the encoded video bitstream and the auxiliary context bitstream to generate the composite bitstream.

In another exemplary embodiment of the disclosed methods, synchronizing the encoded video bitstream and the auxiliary context bitstream comprises matching header information of data packets of the encoded video bitstream with header information of data packets of the auxiliary context bitstream.

In another exemplary embodiment of the disclosed methods, matching header information comprises matching a timestamp or a serial number of the data packets of the encoded video bitstream and/or a timestamp or a serial number of the data packets of the auxiliary context bitstream.

Exemplary embodiments of the disclosed methods further comprise presenting the composite bitstream via a display.

In another exemplary embodiment of the disclosed methods, presenting the composite bitstream comprises presenting with the APP of the remote device.

In another exemplary embodiment of the disclosed methods, presenting the composite bitstream comprises presenting the composite bitstream in a fast-forward mode or a fast-rewind mode.

In another exemplary embodiment of the disclosed methods, positioning an imaging device on an unmanned aerial vehicle ("UAV"), wherein the imaging processor is associated with the imaging device.

Exemplary embodiments of the disclosed methods further comprise storing the video file into a storage medium being positioned on the UAV.

In accordance with another aspect disclosed herein, there is set forth a computer program product comprising instructions for transmitting a video for a remote device configured to perform the transmission process in accordance with any one of previous embodiments of the disclosed methods.

In accordance with another aspect disclosed herein, there is set forth an Unmanned Aerial Vehicle (UAV), comprising:

one or more propulsion units configured to provide lifting power;

a storage medium for storing a video file, and an imaging device, including:

an imaging processor that operates to:

store captured video clip into the storage medium; and transmit video content of the video file and context information via separate communication paths.

In accordance with another aspect disclosed herein, there is set forth an imaging system for handling a video for a remote device, comprising:

one or more processors, individually or collectively, configured to:

transmit video content via a first communication path, and transmit context information via a second communication path being separated from the first communication path.

In an exemplary embodiment of the disclosed systems, the context information is associated with the video content.

In another exemplary embodiment of the disclosed systems, the one or more processors are configured to acquire a video file.

In another exemplary embodiment of the disclosed systems, the video file is loaded from a storage medium to the one or more processors of the imaging system.

In another exemplary embodiment of the disclosed systems, the one or more processors are configured to extract the context information of the video file.

In another exemplary embodiment of the disclosed systems, the context information comprises at least one of an audio data, a caption data, an environmental data and a configuration data.

In another exemplary embodiment of the disclosed systems, the one or more processors are configured to generate an auxiliary context bitstream based on the context information.

In another exemplary embodiment of the disclosed systems, the one or more processors are configured to transcode the context information.

In another exemplary embodiment of the disclosed systems, the one or more processors are configured to decode the context information to generate a first context bitstream.

In another exemplary embodiment of the disclosed systems, the one or more processors are configured to downscale the first context bitstream to generate a second context bitstream.

In another exemplary embodiment of the disclosed systems, the one or more processors are configured to downscale the first context bitstream by reducing a bitrate of the first context bitstream.

In another exemplary embodiment of the disclosed systems, the one or more processors are configured to reduce the bitrate by reducing a bit per second rate of the second context bitstream.

In another exemplary embodiment of the disclosed systems, the one or more processors are configured to reduce the bitrate by reducing a sampling rate of the second context bitstream.

In another exemplary embodiment of the disclosed systems, the one or more processors are configured to encode the second context bitstream to generate an auxiliary context bitstream.

In another exemplary embodiment of the disclosed systems, the second context bitstream is encoded with a protocol that compresses the bitstream.

Exemplary embodiments of the disclosed systems further comprise the second context bitstream is encoded with a protocol that is recognized by an application ("APP") of the remote device to generate the auxiliary context bitstream.

In another exemplary embodiment of the disclosed systems, the one or more processors are configured to extract a video content from the video file.

In another exemplary embodiment of the disclosed systems, the one or more processors are configured to transcode the video content to generate an encoded video bitstream.

In another exemplary embodiment of the disclosed systems, the one or more processors are configured to combine the encoded video bitstream with the auxiliary context bitstream.

In another exemplary embodiment of the disclosed systems, the encoded video bitstream is merged with the auxiliary context bitstream in a synchronized manner to generate a composite bitstream.

In another exemplary embodiment of the disclosed systems, the one or more processors are configured to synchronize the encoded video bitstream and the auxiliary context bitstream by matching header information of data packets of the encoded video bitstream with header information of data packets of the auxiliary context bitstream.

In another exemplary embodiment of the disclosed systems, the header information is matched with a timestamp or a serial number of the data packets of the encoded video bitstream and a timestamp or a serial number of the data packets of the auxiliary context bitstream.

In another exemplary embodiment of the disclosed systems, the composite bitstream is presented via a display.

In another exemplary embodiment of the disclosed systems, the display is the APP of the remote device.

In another exemplary embodiment of the disclosed systems, the display is configured to present the composite bitstream in a fast-forward mode or a fast-rewind mode.

In another exemplary embodiment of the disclosed systems, the one or more processors are positioned on an unmanned aerial vehicle ("UAV").

In another exemplary embodiment of the disclosed systems, the storage medium is positioned on the UAV.

In accordance with another aspect disclosed herein, there is set forth a method for supporting a remote video display, comprising:

receiving content of a video file being transmitted; and adjusting a configuration of an imaging processor based upon the received content.

In an exemplary embodiment of the disclosed methods, receiving the content comprises receiving video content of the video file and/or receiving context information of the video file.

In another exemplary embodiment of the disclosed methods, receiving the video content comprises receiving transcoded video content and/or transcoded context information.

In another exemplary embodiment of the disclosed methods, video content and/or the context information are transcoded for transmitting the video file.

In another exemplary embodiment of the disclosed methods, transcoding the video content comprises transcoding the video content to generate a video bitstream.

In another exemplary embodiment of the disclosed methods, transcoding the context information comprises transcoding the context information to generate a context bitstream.

In another exemplary embodiment of the disclosed methods, transcoding the context information comprises bypassing the transcoding the context information to generate a context bitstream.

Exemplary embodiments of the disclosed methods further comprise merging the video bitstream and the context bitstream to generate a composite bitstream.

In another exemplary embodiment of the disclosed methods, merging comprises synchronizing the video bitstream and the context bitstream for generating the composite bitstream.

In another exemplary embodiment of the disclosed methods, receiving the video file comprises transmitting the composite bitstream to a remote device.

In another exemplary embodiment of the disclosed methods, transmitting the composite bitstream comprises transmitting the composite bitstream to the remote device via a wireless connection or a wired connection.

In another exemplary embodiment of the disclosed methods, adjusting the configuration comprises updating one or more configuration parameters of the imaging processor based on received context information contained within the composite bitstream.

Exemplary embodiments of the disclosed methods further comprise presenting the composite bitstream via an application ("APP") of the remote device.

In another exemplary embodiment of the disclosed methods, adjusting the configuration comprises updating one or more configuration parameters of the imaging processor based on the presented content.

In another exemplary embodiment of the disclosed methods, updating the configuration parameters comprises updating transcoding parameters of the imaging processor.

In another exemplary embodiment of the disclosed methods, updating the transcoding parameters comprises changing at least one of a resolution, a frame per second, a color and bit per second rate of the transcoding.

In another exemplary embodiment of the disclosed methods, updating the transcoding parameters comprises changing at least one of a bit per second rate, a compress rate, a compress format, or a sampling rate of the context bitstream.

In another exemplary embodiment of the disclosed methods, the imaging processor is positioned on an Unmanned Arial Vehicle ("UAV").

In accordance with another aspect disclosed herein, there is set forth a computer program product comprising instructions for configuring an imaging processor with a remote device configured to perform the transfer process in accordance with any one of previous embodiments of the disclosed methods.

In accordance with another aspect disclosed herein, there is set forth a system for supporting remote video display, comprising:

an imaging device, including:
an imaging processor that operates to transmit a video file via transcoding; and
a remote device that operates to:
receive content of the video file being transmitted, and
adjust a configuration of the imaging processor based on the received content.

In an exemplary embodiment of the disclosed systems, the remote device is configured to receive video content of the video file and/or context information of the video file.

Exemplary embodiments of the disclosed systems further comprise an imaging device configured to:
capture the video for storing into the video file; and
transcode the video content and/or the context information.

In an exemplary embodiment of the disclosed systems, the imaging device comprises one or more processors configured to:
process the captured video for storing into the video file; and
transcode the video content and/or the context information for transmitting the video file.

In an exemplary embodiment of the disclosed systems, the one or more processors capture or transcode at different time durations.

In an exemplary embodiment of the disclosed systems, the one or more processors are configured to transcode the video content to generate a video bitstream.

In an exemplary embodiment of the disclosed systems, the one or more processors are configured to transcode the context information to generate a context bitstream.

In an exemplary embodiment of the disclosed systems, the one or more processors are configured to bypass the context information to generate a context bitstream.

In an exemplary embodiment of the disclosed systems, the one or more processors are configured to combine the video bitstream and the context bitstream to generate a composite bitstream.

In an exemplary embodiment of the disclosed systems, the one or more processors are configured to synchronize the video bitstream and the context bitstream for generating the composite bitstream.

In an exemplary embodiment of the disclosed systems, the composite bitstream is transmitted to the remote device.

In an exemplary embodiment of the disclosed systems, the composite bitstream is transmitted to the remote device via a wireless connection or a wired connection.

Exemplary embodiments of the disclosed systems further comprise a remote device configured to adjust the configuration by updating one or more configuration parameters of the one or more processors based on received context information contained within the composite bitstream.

In an exemplary embodiment of the disclosed systems, the remote device is configured to present the composite bitstream via an application ("APP").

In an exemplary embodiment of the disclosed systems, the remote device is configured to update the configuration parameters of the one or more processors based on the presented content.

In an exemplary embodiment of the disclosed systems, the configuration parameters comprise transcoding parameters of the one or more processors.

In an exemplary embodiment of the disclosed systems, the transcoding parameters comprise at least one of a resolution, a frame per second, a color and bit per second rate of the transcoding.

In an exemplary embodiment of the disclosed systems, the transcoding parameters comprise at least one of a bit per second rate, a compress rate, a compress format, or a sampling rate of the context bitstream.

In an exemplary embodiment of the disclosed systems, the imaging device is positioned on an Unmanned Arial Vehicle ("UAV").

The systems can advantageously utilize existing capacities of the imaging processor, such as the capacities of the ISP of the imaging device, to facilitate transmission of the video clip by transcoding the video content and/or the context information of the video clip. The imaging processor can conduct the transmission when the imaging device is not capturing images. Such systems can use the existing capacities of the imaging processor to reduce bandwidth needs of the transmission, thereby, to alleviate a bottleneck issue when the video clip is transmitted over wireless connections.

Figure 1:
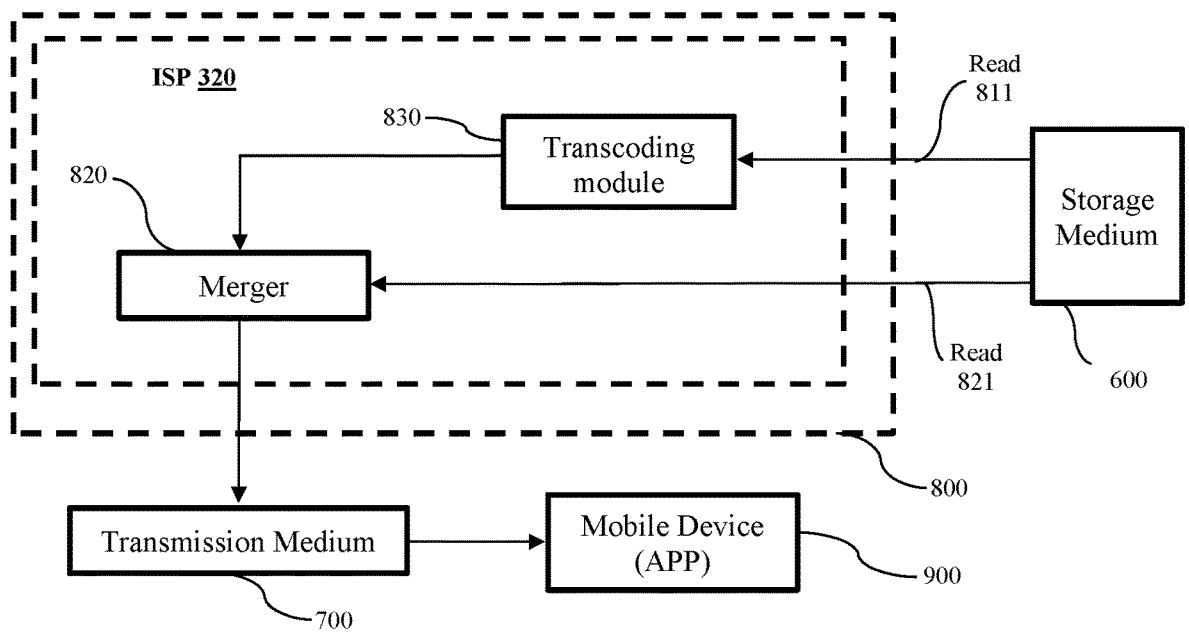
FIG. 1 is an exemplary block diagram illustrating an embodiment of an imaging system that includes an imaging device, a transmission medium and a remote device, wherein the imaging device has an Image Signal Processor ("ISP") for transcoding a video clip, and the remote device is used to present the video clip.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

In currently available presenting systems, such as aerial imaging with an Unmanned Aerial Vehicle ("UAV") systems and other remotely controlled camera systems, wireless transmission is normally applied for transmitting the video. Such systems however are susceptible to transmission bottlenecks due to insufficient transmission bandwidth. Although some systems attempt to alleviate the bottleneck issue by implementing bitrate reduction via HDMI or BT 656 ports before transmitting the video, such systems require an extra central processing unit ("CPU"), resulting in greater complexity and much higher implementation costs.

Since currently-available remote presenting solutions require costly hardware and can cause communication bottlenecks, a system and method for presenting a video clip with assistance of available resources of an imaging device advantageously can alleviate the communication bottleneck and provide a basis for providing remote presenting function for mobile platforms, such as Unmanned Aerial Vehicles ("UAVs"). This result can be achieved, according to one embodiment, by an exemplary system 200 illustrated in FIG. 1.

Turning to FIG. 1, the imaging system 200 is illustrated as including an imaging device 800, a transmission medium 700 and a remote device 900. The imaging device 800 can be associated with an imaging processor that can comprise one or more processors that operate individually or collectively. The imaging processor is shown, in FIG. 1, as being an Image Signal Processor ("ISP") 320. In FIG. 1, the ISP 320 can read video content of a video clip, at 811 from a storage medium 600. Additional detail regarding the storage medium 600 will be provided below with reference to FIGS. 14 and 17. The ISP 320 can read the video content of the video clip from the storage medium 600 via any conventional manners.

Although shown and described as reading the video content from the storage medium 600 for purposes of illustration only, the ISP 320 can read the video content from any other suitable sources or acquire the video content by extracting the video content from the video clip.

The ISP 320 can include a transcoding module 830 for transcoding the video content. The transcoding module 830 can be a software program that is executed by the ISP 320 or can include hardware, software, firmware or a combination thereof. The transcoding module 830 can transcode the video content via the steps shown and described with reference to FIGS. 14 and 17. The video content can have a lower bitrate after the transcoding module 830 than that before the transcoding module 830, thereby, can save a bandwidth when being transmitted.

In some embodiments, the ISP 320 can read context information of the video clip from the storage medium 600, at 821. The ISP 320 can read the context information of the video clip from the storage medium 600 via any conventional manners. Alternatively and/or additionally, the ISP 320 can read the context information from any other suitable sources or acquire the context information by extracting the context information from the video clip.

The ISP 320 can include a merger 820 that can be a software program that is executed by the ISP 320 or can include hardware, software, firmware or a combination thereof. The merger 820 can merge the transcoded video content with the context information to generate a combined video bitstream. Additional detail regarding the merger 820 and the combined video bitstream will be provided below with reference to FIG. 14.

The combined video bitstream can be transmitted, via a transmission medium 700, to a mobile device 900 for presenting the video clip. Although shown and described as transcoding the video content for purposes of illustration only, the ISP 320 can optionally transcode the context information. Because of reduced bitrate of the video content and/or the reduced bitrate of the context information, the system 200 can advantageously alleviate a communication bottleneck with the transmission medium 700.

Figure 2:
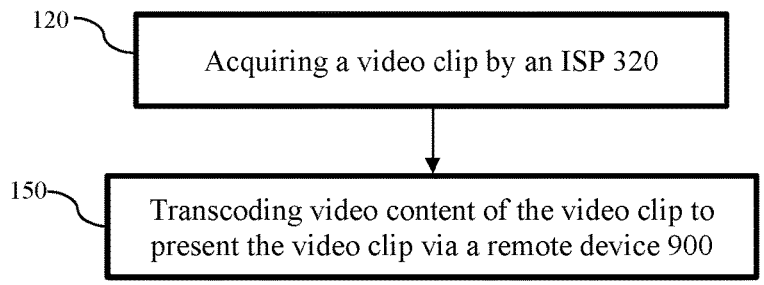
FIG. 2 is an exemplary top-level flow-chart illustrating an embodiment of method for presenting a video clip via a remote device, wherein the video clip is acquired and video content of the video clip is transcoded.

Turning to FIG. 2, a method 100 can enable a video clip to be presented via a remote device 900. The video clip is shown as being acquired and transcoded by an ISP 320. In FIG. 2, the video clip can be retrieved or otherwise acquired by the ISP 320, at 120. The ISP 320 can be associated with any type of imaging device 800 (shown in FIG. 12) with a capacity of capturing still images and/or moving images (or video clips). In some embodiments, the ISP 320 has image processing capabilities. Exemplary image processing capacities can include, but are not limited to, decoding, encoding and/or downscaling functionalities. In some embodiments, the ISP 320 can acquire the video clip while not capturing images. In some other embodiments, the ISP 320 can acquire the video clip regardless of whether the imaging device 800, that the ISP 320 is associated with, is capturing images.

The video clip can be contained a video file that is captured by the imaging device 800 and/or obtained from any other sources, e.g., captured by another imaging device 800. The video file can reside in a storage device, such as a storage medium 600 (shown in FIG. 9), in a format that is compatible with the imaging device 800. The video clip can include both video content and/or context information associated with the video content. Such context information can include, but is not limited to, audio content and/or metadata. The metadata can include, but is not limited to, automatically collected video metadata, such as aperture, shutter speed, location coordinates, Global Positioning System ("GPS") coordinates and the like, as well as manual written information, such as transcripts of dialogue or conversations and other text descriptions. In some embodiments, the video content can be contained in the video file. The context information can be at least partially included in the video file and/or included in some other resources. For example, the audio data and/or the captions can be separately captured and/or stored from the video content.

For purposes of presenting the video clip via a remote device 900, the video clip can be converted to a format compatible with the remote device 900, and the video clip can be transmitted to the remote device 900. In some embodiments, the ISP 320 has powerful image processing capacities and can utilize those capacities to convert the video clip. For example, if the ISP 320 includes powerful encoding and/or decoding capacities, the ISP 320 advantageously can convert the format of the video clip to the format compatible to the remote device 900 via the decoding and/or encoding capacities. The ISP 320 can also reduce a size of the video clip to facilitate a transfer of the video clip while decoding and encoding the video clip.

As illustrated in FIG. 2, the video content of the video clip can be transcoded, at 150. The video content of the video clip can be transcoded, for example, to reduce the size of the video clip to facilitate transmitting the video clip. As set forth above, the video clip can consist of two components: the video content, and the context information of the video content. In some embodiments, of the two components, the video content can comprise much more volume than the context information. Therefore, a reduction of a size of the video content can lower a bitrate for transmitting the video clip, in part and/or in its entirety. In some embodiments, the video content and the context information can be processed separately and only the video content is transcoded in order to lower the bitrate of the video clip. Transcoding the video content, for example, can include decoding, downscaling and/or encoding operations toward the video content.

The transcoded video content and/or the context information can be presented via the remote device 900. The remote device 900 can be any type of device that has an application ("APP") installed for presenting the video content and/or the context information. Such devices can include, but are not limited to, any remote device, such as a smartphone, an iPad®, a personal digital assistant (or PDA), a notepad or any other type of computing device that can execute an APP and that can present the video content and/or the context information. The APP can provide a user with an optimized user interface that can present the user with improved operation experience. In some embodiments, the remote device 900 can present the video content and/or the context information in one of a plurality of presenting modes, including, but not limited to, a fast-forward mode and/or a fast-rewind mode.

Although shown and described as transcoding only the video content for purposes of illustration only, the context information can be transcoded for reducing the size of the video clip to facilitate the transmission.

Figure 3:
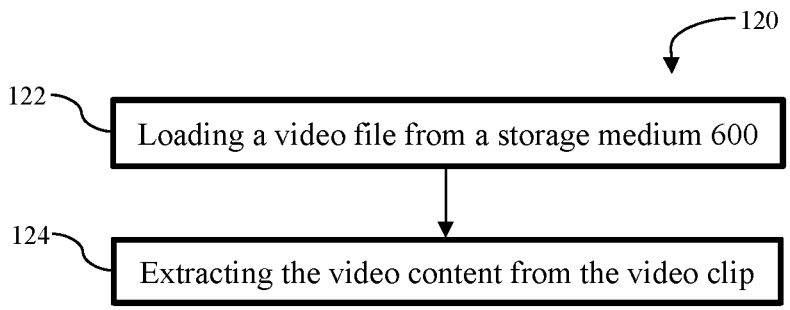
FIG. 3 is an exemplary flow-chart illustrating an alternative embodiment of the method of FIG. 2, wherein the video clip is acquired by loading a video file and extracting the video content from the video clip.

FIG. 3 illustrates an alternative embodiment of the method 100. Turning to FIG. 3, the video clip of FIG. 2 can be acquired by loading a video file from a storage medium 600, at 122, and the video content can be extracted from the video clip, at 124. In FIG. 3, the video clip can be loaded to an ISP 320 (shown in FIG. 2) by reading a video file containing the video clip from the storage medium 600, at 122. The video file can be read in any conventional manner, including reading the file, in part and/or in its entirety, and/or reading the video file as a bitstream.

At 124, the video content can be extracted from the video clip. The extracting of the video content from the video clip can be conducted while the video file is being read. Alternatively and/or additionally, the extracting of the video content can be conducted when the video clip is read into the ISP 320, in part and/or in its entirety. The extracting of the video content can be performed in any suitable manner. The extracted video content can be in an encoded format that is recognizable to the ISP 320.

Although shown and described as being loaded from the storage medium 600 for purposes of illustration only, the video clip can be acquired from other sources, e.g., from another imaging device 800 for capturing the video clip.

Figure 4:
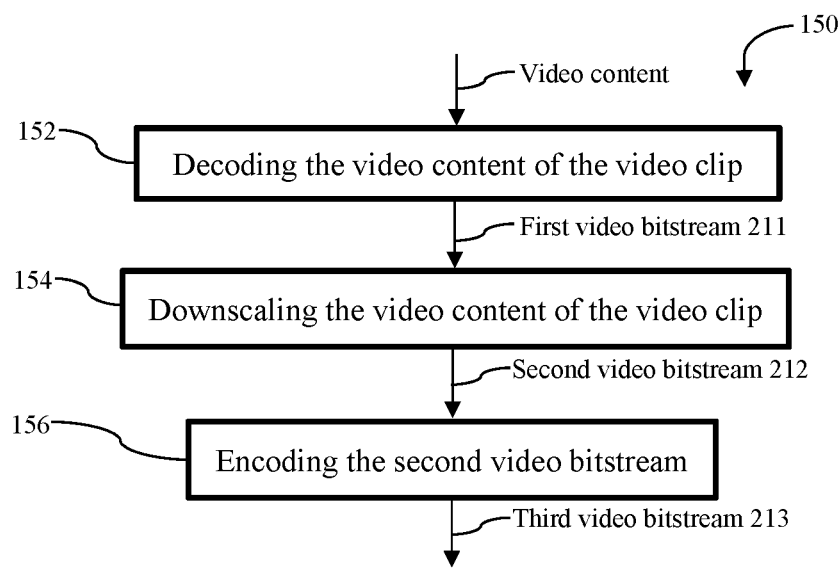
FIG. 4 is another exemplary flow-chart illustrating another alternative embodiment of the method of FIG. 2, wherein the video content is transcoded by decoding, downscaling and encoding.

FIG. 4 illustrates an alternative embodiment of the exemplary method 100. Turning to FIG. 4, the video content of FIG. 2 is shown as being transcoded by decoding, downscaling and encoding. A video clip acquired by an ISP 320, as shown and described herein, can be stored in as a video file on a storage medium 700 (shown in FIG. 14). The video clip can be stored in an encoded and/or compressed format to save storage space in the storage medium 700, in accordance with a public protocol and/or a proprietary protocol, while preserving quality of the video clip. Exemplary public protocols can include, but are not limited to, a MPEG-4 Part 10 protocol or an Advanced Video Coding ("H.264") protocol.

In FIG. 4, the video content can be decoded to generate a first video bitstream 211, at 152. Advantageously, the video content can be decoded, for example, when the video content is being read and/or when the video content is being extracted. The first video bitstream 211 can be a bitstream of restored raw video data. As described herein, in some embodiments, the ISP 320 has powerful capacity of encoding and/or decoding a video clip or the video content of the video clip. Therefore, the video clip can be decoded by the ISP 320, particularly via the ISP 320.

The first video bitstream 211 can have a high bitrate. For example, a high definition 1080p video with a protocol H.264 can have a bitrate of 5000 kbps, a standard definition 480p video can have a bitrate of 2500 kbps and a low definition 360p can have a bitrate of 1200 kbps. A wireless connection can be a bottleneck for transmitting a video clip with such high bitrates. Therefore, in some embodiments, the bitrate of the video clip can be reduced while the video clip is decoded.

At 154, after the video content of the video clip is being decoded to generate the first video bitstream 211, the first video bitstream 211 can be downscaled to reduce the bitrate or a data size of the first video bitstream 211 to generate a second video bitstream 212. In some embodiments, the first video bitstream 211 can be downscaled by, e.g., reducing a resolution or reducing a frame per second rate of the video content. A bitrate of the second video bitstream 212, for example, can be several times less than the bitrate of the first video bitstream 211. As an exemplary example, a reduction from high definition 1080p video to low definition 360p video can reduce the bitrate from 5000 kbps to 1200 kbps. Similarly, a reduction of frame per second rate can result in linear reduction of the bitrate of the video clip.

Although shown and described as downscaling the video content after the encoding of the video content for purposes of illustration only, the downscaling step 154 can be performed at any suitable moment, e.g., while decoding step 152 is being performed.

In some embodiments, the bitrate reduction can be configurable via certain transcoding parameters, such as a resolution reduction ratio and/or a reduction ratio for frame per second rate. Quality and/or continuity of a video presentation result can be adjusted via such transcoding parameters. In some other embodiments, the transcoding parameters can be adjusted when the video is presented in a fast-forward mode or a fast-rewind mode.

The downscaled second video bitstream 212 can be encoded, at 156, to generate a third video bitstream 213 that can further facilitate a transmission of the video clip. The second video bitstream 213 can be encoded in accordance with a protocol that is recognizable by a video viewing APP of the remote device 900 (shown in FIG. 13). Although shown and described as using an APP to present the video clip for purposes of illustration only, the video clip can be presented via any suitable device. Additional detail regarding the presenting device will be discussed below with reference to FIG. 14.

Figure 5:
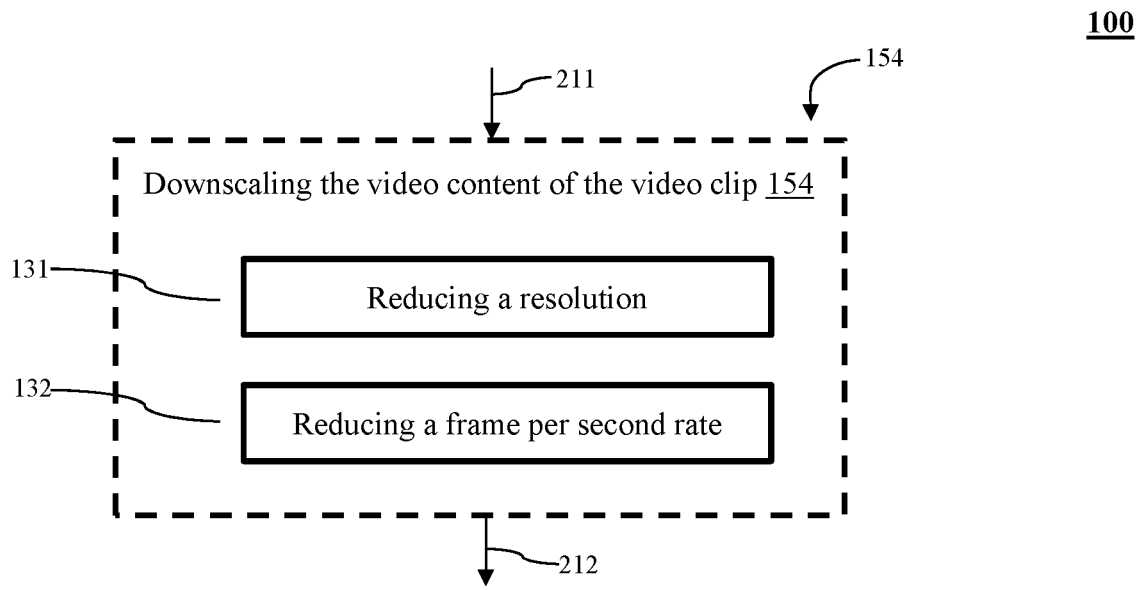
FIG. 5 is an exemplary flow-chart illustrating another alternative embodiment of the method of FIG. 4, wherein the video content is downscaled by reducing a resolution and/or reducing a frame per second rate.

FIG. 5 illustrates an alternative embodiment of the exemplary method 100. Turning to FIG. 5, the video content of the video clip can be downscaled by reducing a resolution or reducing a frame per second rate of the first video bitstream 211. As shown in FIG. 5, the bitrate of the first video bitstream 211 can be reduced via reducing the resolution of the first video bitstream 211, at 131, or reducing the frame per second rate of the first video bitstream 211, at 132.

At 131, the bitrate of the first video bitstream 211 can be reduced by lowering the resolution of the first video bitstream 211. The resolution (also known as presenting resolution) for a digital video clip is a number of distinct pixels of each frame contained in the video clip. The resolution can be set forth as a predetermined number of pixels in each dimension that can be presented in the frame, which can be represented as width by height, with units of pixels. As an exemplary example, a high definition video can have a resolution of 1024×768, meaning the width of the frame can be 1024 pixels and the height of the fame can be 768 pixels. For purposes of presenting the video clip, the resolution can be reduced to, e.g., 320×240 with certain expenses of image quality.

The resolution reduction can be performed in any conventional manner. Reduction of a resolution of the first video bitstream 211 can result in a reduction of the bitrate of the first video bitstream 211. In an alternative embodiment, the resolution reduction can be adjusted with a set of resolution parameters as part of transcoding parameters. Alternatively and/or additionally, reduction rates in either and/or both directions can be adjusted in a manual or automatic manner.

At 132, the bitrate of the first video bitstream 211 can be reduced by lowering the frame per second rate. The frame per second rate (also known as frame rate or frame frequency) is a frequency at which an imaging device can present consecutive frames. For example, the video clip can have an exemplary frame per second rate of 20 FPS (frame per second) to 90 FPS that can be reduced to, e.g., 10 FPS to 30 FPS.

Lowering the frame per second rate can be performed in any conventional manner. Like resolution reduction, reduction of the frame per second rate of the first video bitstream 211 can result in a reduction of the bitrate of the first video bitstream 211. In an alternative embodiment, the reduction of the frame per second rate can be adjusted, as part of the transcoding parameters, with a set of frame per second parameters in a manual or automatic manner.

Although shown and described as reducing the bitrate with either lowering the resolution or the frame per second rate for illustrative purposes only, the bitrate of the first video bitstream 211 can also be reduced by a combination of lowering the resolution and the frame per second rate. Alternatively and/or additionally, any other approach for reducing the bitrate of the first video bitstream 211 can be applied, e.g., any applicable compression approaches.

Figure 6:
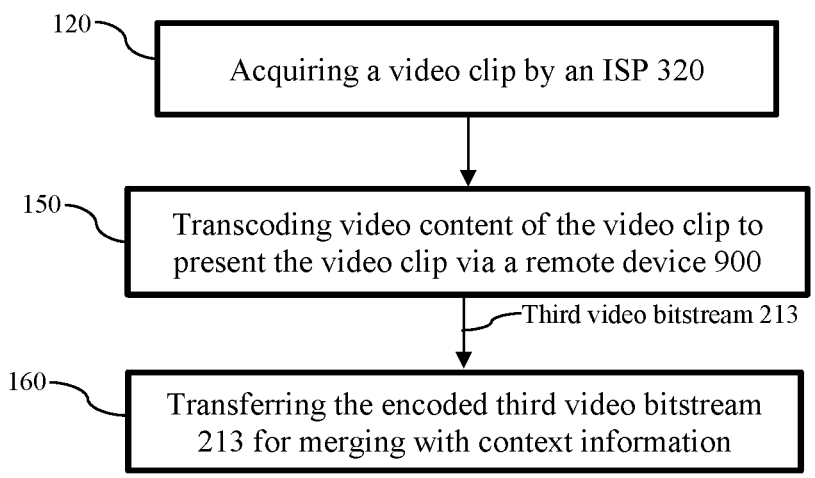
FIG. 6 is an exemplary flow-chart illustrating another alternative embodiment of the method of FIG. 2, wherein the transcoded video content is transmitted for merging with context information.

FIG. 6 illustrates an alternative embodiment of the exemplary method 100. Turning to FIG. 6, the transcoded video content can be transmitted for merging with other content. In some embodiments, the other content can be context information of the video clip, which can be stored as part of the video clip or be acquired from other sources. The transcoded video content can be in a format of a third video bitstream 213.

As illustrated in FIG. 6, the third video bitstream 213 can be transmitted, at 160, for merging with the context information. The third video bitstream 213 can be merged with the context information at a location at, and/or adjacent to, the ISP 320. In some embodiment, the third video bitstream 213 and the context information can be merged at the ISP 320 and the merged bitstream, e.g., a composite bitstream 411, can be transmitted to a remote device 900 via a transmission medium 700 (collectively shown in FIG. 14). The transmission medium 700 can be any type of medium that can perform the transmission, including but not limited to, a wired connection, a wireless connection, any type of network, such as the Internet, and the like.

In alternative embodiments, the third video bitstream 213 and the context information can be transmitted from the ISP 320 to the remote device 900 in separated communication channels. In the alternative embodiments, the third video bitstream 213 and the context information can be merged with a selected device (not shown) other than the ISP 320.

The third video bitstream 213 can be transmitted in accordance with a public protocol or a proprietary protocol. Such protocols can include, but are not limited to, a Real Time Messaging Protocol ("RTMP") protocol or a Real Time Streaming Protocol ("RTSP") protocol, or any suitable proprietary transfer protocols.

Figure 7:
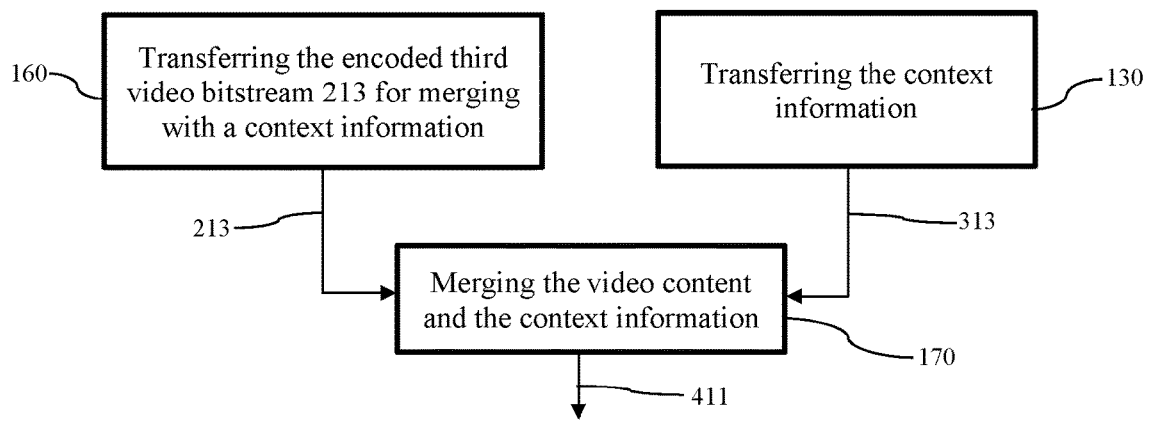
FIG. 7 is an exemplary flow-chart illustrating another alternative embodiment of the method of FIG. 6, wherein the video content and context information are merged to generate composite video content.

FIG. 7 illustrates an alternative embodiment of the exemplary method 100. Turning to FIG. 7, the third bitstream 213 and the auxiliary context bitstream 313 can be merged to generate a composite bitstream 411. As shown in FIG. 7, a third video bitstream 213 can be transmitted, at 160, for merging with auxiliary context bitstream 313. The third video bitstream 213, as shown and described herein, can be acquired by transcoding video content of the video clip. The third video bitstream 213 can be in a format that is compatible of merging with the auxiliary context bitstream 313.

At 130, the auxiliary context bitstream 313 can be transmitted for merging with the third video bitstream 213. The auxiliary context bitstream 313 can represent context information of the video clip and can be acquired via transcoding the context information or via directly transmitting the context information. At 170, a composite bitstream 411 is created by merging any applicable bitstream tool, such as a Transport Stream Packet Editor ("TSPE") and the like.

The merging, at 170, can be triggered manually or automatically. In a configuration where an imaging device 800 is arranged on a UAV 901 (collectively shown in FIG. 18) or any other type of mobile platform, merging of the third video bitstream 213 and the auxiliary context bitstream 313 can be performed either on the UAV 901 or via a terrestrial device. Although shown and described that the merging can be triggered manually or automatically for purposes of illustration only, in some embodiments, the whole process can be controlled and/or operated in an automatic manner.

Figure 8:
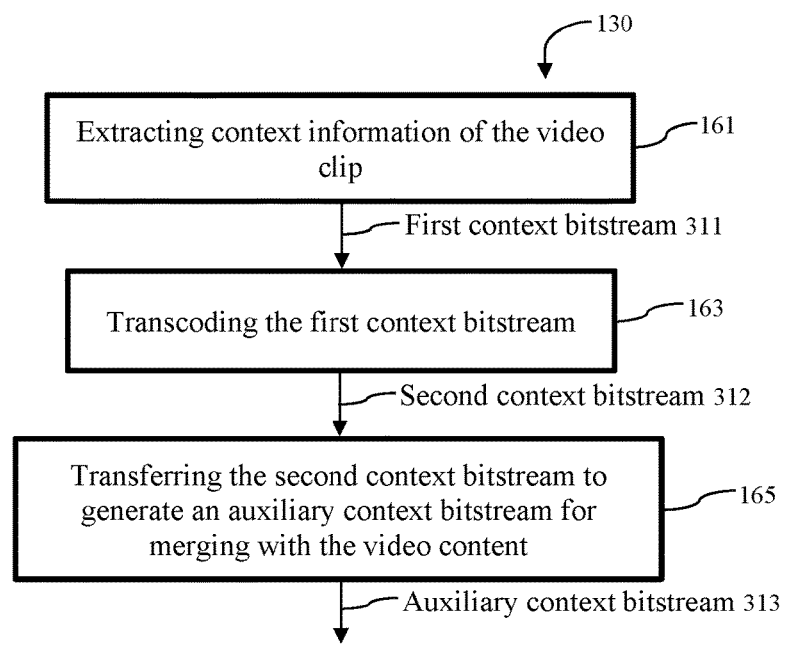
FIG. 8 is an exemplary flow-chart illustrating another alternative embodiment of the method of FIG. 7, wherein context information of the video clip is transcoded and transmitted for merging with the video content.

FIG. 8 illustrates an alternative embodiment of the method 100. Turning to FIG. 8, context information of a video clip can be transcoded and transmitted, at 130, for merging with the third video bitstream 213. In FIG. 8, the context information of the video clip can be extracted, at 161, to create a first context bitstream 311. The context information can be extracted via any conventional manner. Although shown and described as being extracted from the video clip for purposes of illustration only, the context information can also be acquired from other sources, e.g., via manually inputting caption with a keyboard or via automatically collecting imaging data and the like.

At 163, the first context bitstream 311 can be transcoded to create a second context bitstream 312. The first context bitstream 311 can be transcoded, in a similar manner as shown and described with reference to FIGS. 2-4, by reducing a bitrate of the first context bitstream 311. The reduction of the bitrate of the first context bitstream 311 can be conducted in accordance with the reduction of a bitrate of the video content. For example, the reduction of the bitrate of the first context bitstream 311 can follow a corresponding reduction rate with the reduction of the video content when a reduction of frame per second rate is applied.

At 165, an auxiliary context bitstream 313 can be generated by encoding the second context bitstream 312. The auxiliary context bitstream 313 can be transmitted to a location where the auxiliary context bitstream 313 can meet the third video bitstream 213 (shown in FIG. 6) for merging with the third video bitstream 213.

Although shown and described as applying similar approaches to reduce the bitrate of the first context bitstream 311 for purposes of illustration only, the bitrate of the first context bitstream 311 can be reduced by other applicable approaches, e.g., stripping off unnecessary information from the context information. Although shown and described as transcoding the first context bitstream 311 for purposes of illustration only, in some embodiments, the context information can be transmitted for merging with the third video bitstream 213 directly, making transcoding the first context bitstream 311, at 163, optional.

Figure 9:
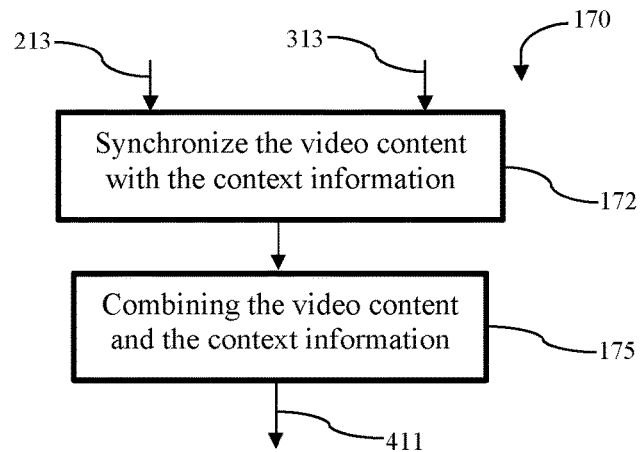
FIG. 9 is another exemplary flow-chart illustrating another alternative embodiment of the method of FIG. 8, wherein the video content and the context information are synchronized when being merged.

FIG. 9 shows an alternative embodiment of the method 100. Turning to FIG. 9, video content and context information of a video clip can be synchronized when being merged, at 170. As shown and described with reference to FIG. 8, at 172, the video content can be in a form of a third video bitstream 213 and the context information can be in a form of an auxiliary context bitstream 313. The third video bitstream 213 and the auxiliary context bitstream 313 each can have certain type of matching marks, such as timestamps for matching between each other.

The timestamps of the third video bitstream 213 can be a sequence of characters representing the times, e.g., at which the video clip was recorded. The timestamps can be distributed evenly or unevenly along the third video bitstream 213 to ensure satisfactory matching with the auxiliary context bitstream 313. For a purpose of this disclosure, the timestamps can either be absolute timestamps or relative timestamps. Additionally and/or alternatively, the timestamps can be distributed along the auxiliary context bitstream 313 in a same manner or a different manner as the timestamps of the third video bitstream 213 to ensure satisfactory matching with the third video bitstream 213.

The third video bitstream 213 and the auxiliary context bitstream 313 can be synchronized, at 172, for example, by matching the timestamps of the third video bitstream 213 with the timestamps of the auxiliary context bitstream 313. At 175, matched portions of the third video bitstream 213 and the auxiliary context bitstream 313 can be combined (or merged) to form a composite bitstream 411 in a similar manner shown and described with reference to the composite bitstream 411 of FIG. 7.

Although shown and described as using timestamps for purposes of illustration only, the third video bitstream 213 and the auxiliary context bitstream 313 can be synchronized with any other suitable form of matching marks, such as packet labels.

Figure 10:
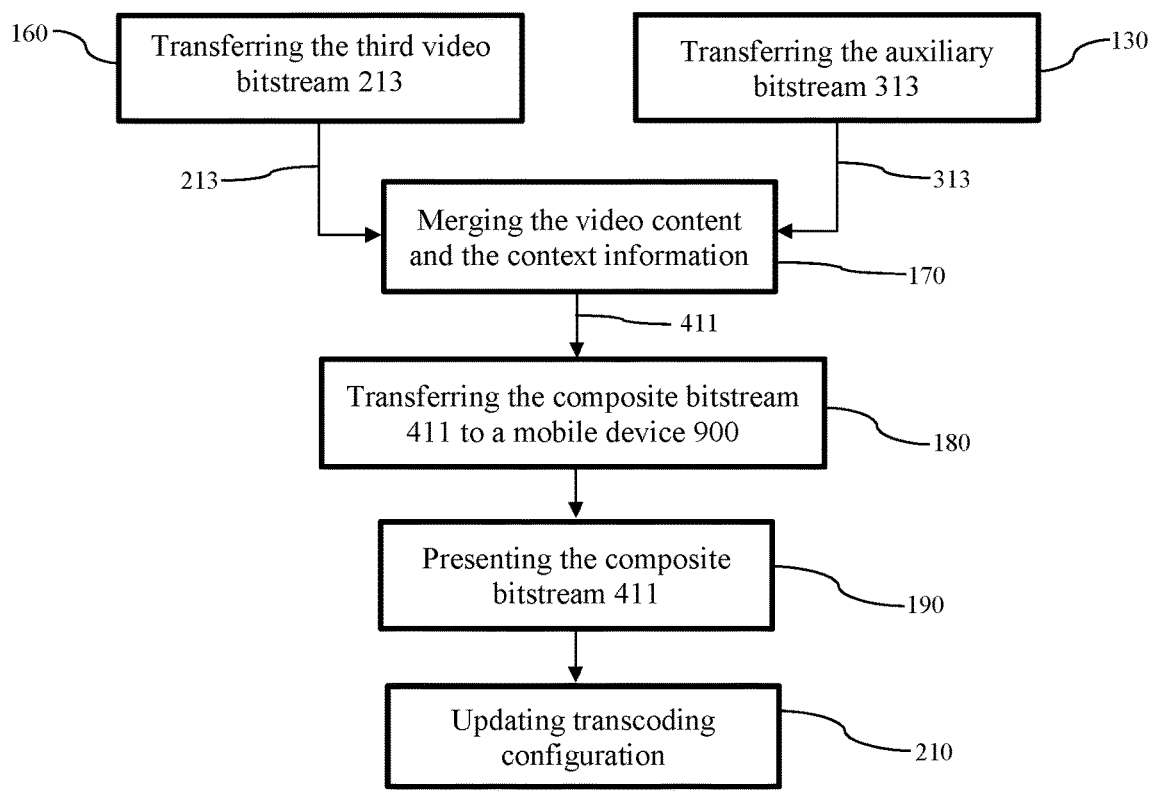
FIG. 10 is another exemplary flow-chart illustrating another alternative embodiment of the method of FIG. 2, wherein the composite video content is transmitted and presented.

FIG. 10 shows another alternative embodiment of the exemplary method 100. Turning to FIG. 10, the third video bitstream 213 and the auxiliary bitstream 313 can be transmitted, at 160, 130, for merging the video content and the context information, at 170, to generate a composite bitstream 411. The composite bitstream 411 generated, at 170, can be transmitted to a remote device 900 for presentation, at 180. In FIG. 10, the third video bitstream 213 transmitted, at 160, and the auxiliary context bitstream 313 transmitted, at 130, can be merged, at 170, to generate the composite bitstream 411. In other words, the composite bitstream 411 can contain both video content and context information.

At 180, the composite bitstream 411 can be transmitted to the remote device 900 via any transmission medium 700

(shown in FIG. 14), such as a wired communication connection, a wireless communication connection, a network connection or the like. The composite bitstream 411 can be transmitted in accordance with a public protocol or a proprietary protocol including but not limited to, a Real Time Messaging Protocol ("RTMP") protocol or a Real Time Streaming Protocol ("RTSP") protocol, any suitable proprietary transmit protocols and the like.

The remote device 900 can run a video application ("APP") that can present the composite bitstream 411. The APP can provide a user with an optimized user interface that can present the user with improved operation experience. In some embodiments, the remote device 900 can present the composite bitstream 411 in a fast-forward mode and/or a fast-rewind mode. The remote device 900 can be a smartphone, an iPad®, a notepad and the like. Such APPs can comprise any application including but not limited to, a BSPlayer, an MXPlayer, a DicePlayer and the like. The composite bitstream 411 can be presented to a user (not known) who can update configuration settings of an ISP 320 for transcoding, at 210. In some embodiments, the configuration settings can be updated according to operations of the remote device 900.

Although shown and described as presenting the composite bitstream 411 for updating the configurations for purposes of illustration only, the configuration can be updated based only on the context information, and/or the process can be performed in an automatic manner based on the context information.

Figure 11:
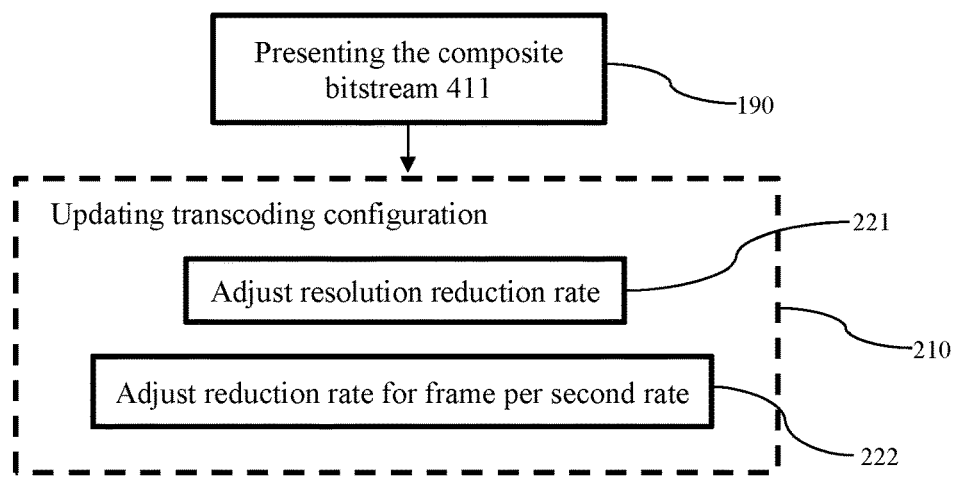
FIG. 11 another exemplary flow-chart diagram illustrating another alternative embodiment of the method of FIG. 2, wherein the transcoding configurations are updated based on the presented the composite video content.

FIG. 11 illustrates another alternative embodiment of the exemplary method 100. Turning to FIG. 11, the transcoding configuration can be updated based on the presented composite video content. In FIG. 11, the composite bitstream 411 can be presented, at 190, via, for example, a remote device 900 (shown in FIG. 14). As shown and described herein, the presented information can be used to update configuration for transcoding the video content and/or the context information, at 210.

The configuration for transcoding can include, but is not limited to, a resolution reduction rate and/or a reduction rate for frame per second rate. The resolution reduction rate can be adjusted, at 221, based on a resolution quality of the presented information. For example, when the resolution quality is unsatisfied, the resolution reduction rate can be decreased, and vice versa. Similarly, the reduction rate for frame per second rate can be adjusted, at 222, based on a continuity of the presented information and/or a real-time presentation operation, e.g., a fast-forward operation or a fast-rewind operation. For example, when the continuity of the presented information is unsatisfied, the reduction rate for frame per second rate can be decreased, and vice versa.

Figure 18:
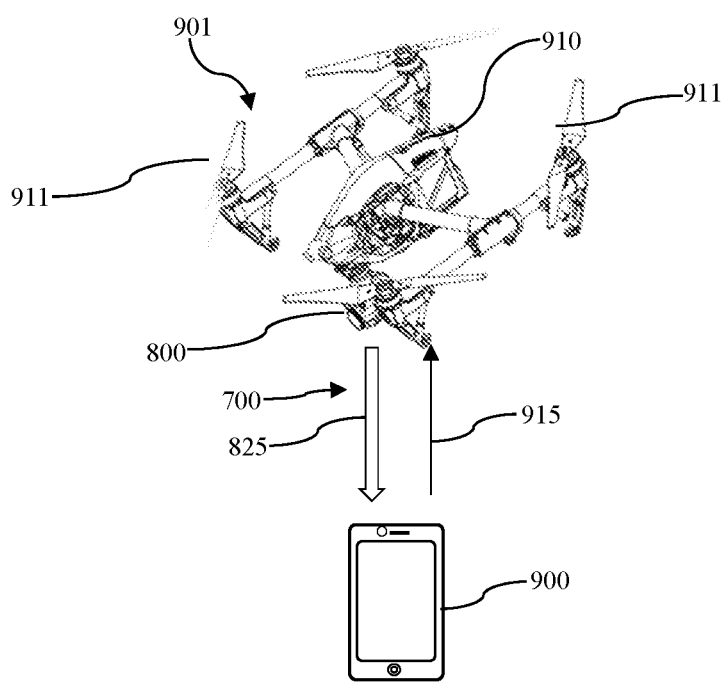
FIG. 18 is an exemplary schematic diagram illustrating an embodiment of the imaging system of FIG. 12, wherein the imaging device is positioned on a mobile platform.

The configuration can be updated via another APP installed on the remote device 900 or via another device, such as a controller that can control the imaging device 800 and/or the UAV 901 (shown in FIG. 18). Although shown and described as adjusting the transcoding configuration for the video content for purposes of illustration only, processing configuration of context information can also be updated based on the presented information, e.g., in some embodiment, transcoding of the context information can be switched on or off.

Figure 12:
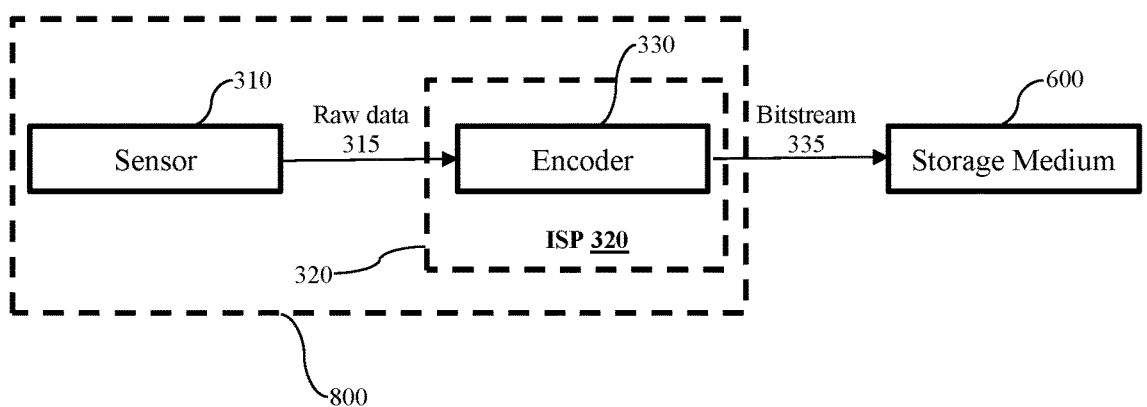
FIG. 12 is an exemplary top-level block diagram illustrating an embodiment of an imaging system that includes an imaging device for capturing a video clip and a storage medium for storing the video clip.

FIG. 12 illustrates an exemplary embodiment of an imaging system 200. Turning to FIG. 12, the imaging system 200 includes an imaging device 800 and a storage medium 600. In some embodiments, the imaging system 200 can be configured to execute the method 100 discussed above with reference to FIGS. 1-10. As shown in FIG. 12, the imaging device 800 can be associated with an imaging processor that can comprise one or more processors that operate individually or collectively. The imaging processor is shown, in FIG. 12, as being an Image Signal Processor ("ISP") 320. The ISP 320 can be provided in communication with a storage medium 600. The imaging device 800 can capture video clips for storing into the storage medium 600. The imaging device 800 can comprise any type of imaging device with a capacity of capturing still images or moving images (or video clips), including but not limited to, a natural light camera, a laser camera, an infrared camera, an ultrasound camera and the like.

The imaging device 800 is shown as consisting of a sensor 310 and the ISP 320. The sensor 310 can be adapted for capturing images that can form the video clips. The sensor 310 can capture the images and transmit the images as raw video data 315 to the ISP 320. The ISP 320 can include an encoder 330 for encoding the raw video data 315 into bitstream 335. The encoder 330 can be separate from the ISP 320 and/or, as shown in FIG. 12, can be at least partially integrated with the ISP 320. The encoded bitstream 335 can be stored in the storage medium 600 to a video file containing the video clip representing the encoded bitstream 335.

The video clips captured by the imaging device 800 can usually be in a high resolution. Therefore, the encoder 330 can encode the video clips in accordance with a protocol capable for handling high resolution image data, such as a MPEG-4 Part 10, Advanced Video Coding ("H.264") or any protocols under a High Efficiency Video Coding (HEVC) standard, including but not limited to, MPEG-H Part 2 and ITU-T H.265 and the like. As shown and described herein, in some embodiments, the ISP 320 can have powerful capacities in encoding and/or decoding video clips.

The encoded bitstream 335 can be stored into the storage medium 600. The storage medium 600 can be attached to the imaging device 800 or otherwise associated with the imaging device 800 in any manner. The storage medium 600 can be of any type of storage media that can be accessed by the imaging device 800, including but not limited to, a secure digital card ("SD"), an embedded multimedia card ("eMMC"), a solid state drive ("SSD"), a USB disk, or any other type of mobile disk, and the like. The storage medium 600 can have enough storage volume and/or enough speed for storing the video clips and for accessing the video clips by the imaging device 800.

Although shown and described as comprising an encoder for purposes of illustration only, the encoder 330 can comprise a software module and/or a software program running in the ISP 320, or can include hardware, software, firmware or a combination thereof.

Figure 13:
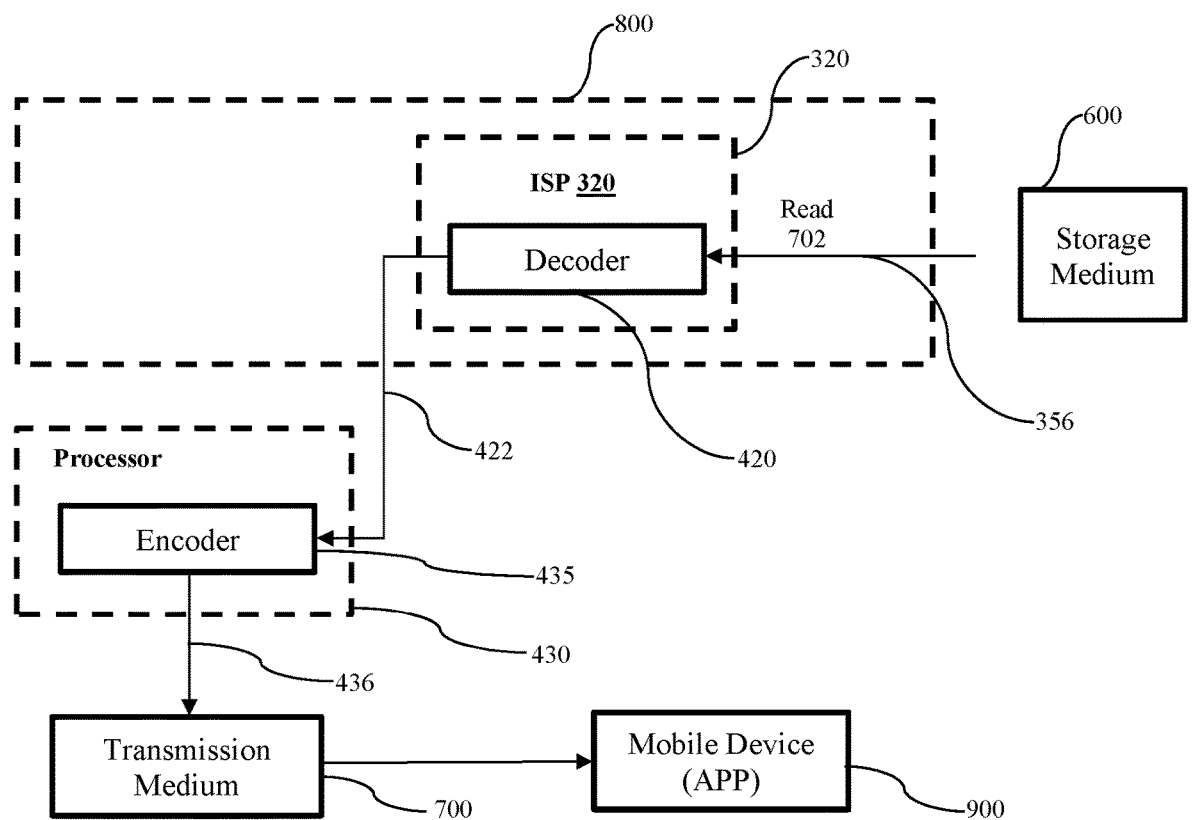
FIG. 13 is an exemplary block diagram illustrating an alternative embodiment of the imaging system of FIG. 12, wherein the video clip is transmitted to a remote device for presentation.

FIG. 13 illustrates another exemplary embodiment of the apparatus 200. Turning to FIG. 13, a stored video clip can be transmitted from a storage medium 600 to a remote device 900 for presentation. In FIG. 13, when an imaging device 800 is not capturing a video clip, an ISP 320 of the imaging device 800 can be used to facilitate transmitting the stored video clip.

The video clip, being either captured by the same imaging device 800 or stored in the storage medium 600 from another source, can be retrieved by the ISP 320 associated with the imaging device 800 as encoded video content 702. The ISP 320 can include a decoder 420 that can decode the content of the video clip. In other words, the decoder 420 can be at least partially integrated with the ISP 320 of the imaging device 800. The decoded content can be passed, as a decoded video bitstream 422, to another processor 430 for further processing. The processor 430 that can be a dedicated image processor and is illustrated as being external from the imaging device 800. The imaging device 800 can include a special port (not shown) for passing the decoded content to the processor 430. The special port can include, but is not limited to, a High Definition Multimedia Interface ("HDMI") port or a BT.656 (also known as ITU656) interface and the like.

The processor 430 can be associated with an encoder 435 that can encodes the decoded content to generate an encoded video bitstream 436. The encoder 435 can be separate from the processor 430 and/or, as shown in FIG. 13, can be at least partially integrated with the processor 430. The encoder 435 can encode the decoded content in accordance with any protocols that are compatible with a video application ("APP") installed on a remote device 900. Depending on the characteristics of the APP, such protocols can include, but are not limited to, a 3rd Generation Partnership Project ("3GPP"), Motion Picture Experts Group ("MPEG4"), Real Time Streaming Protocol ("RTSP"), Flash Lite, Mobiclip and the like.

The encoded video bitstream 436 can be transmitted to the remote device 900 via a transmission medium 700. The transmission medium 700 can be any type of wired and/or wireless communication connection or any type of network connections. The APP installed on the remote device 900 can be used to present the video clip via the encoded video bitstream 436 while the encoded video bitstream 436 is being transmitted. In one embodiment, the remote device 900 can include a video display (not shown) for presenting the video clip.

Although shown and described as being separate from the imaging device 800 for purposes of illustration only, the encoder 435 can be at least partially integrated with the ISP 320 associated with the imaging device 800.

Figure 14:
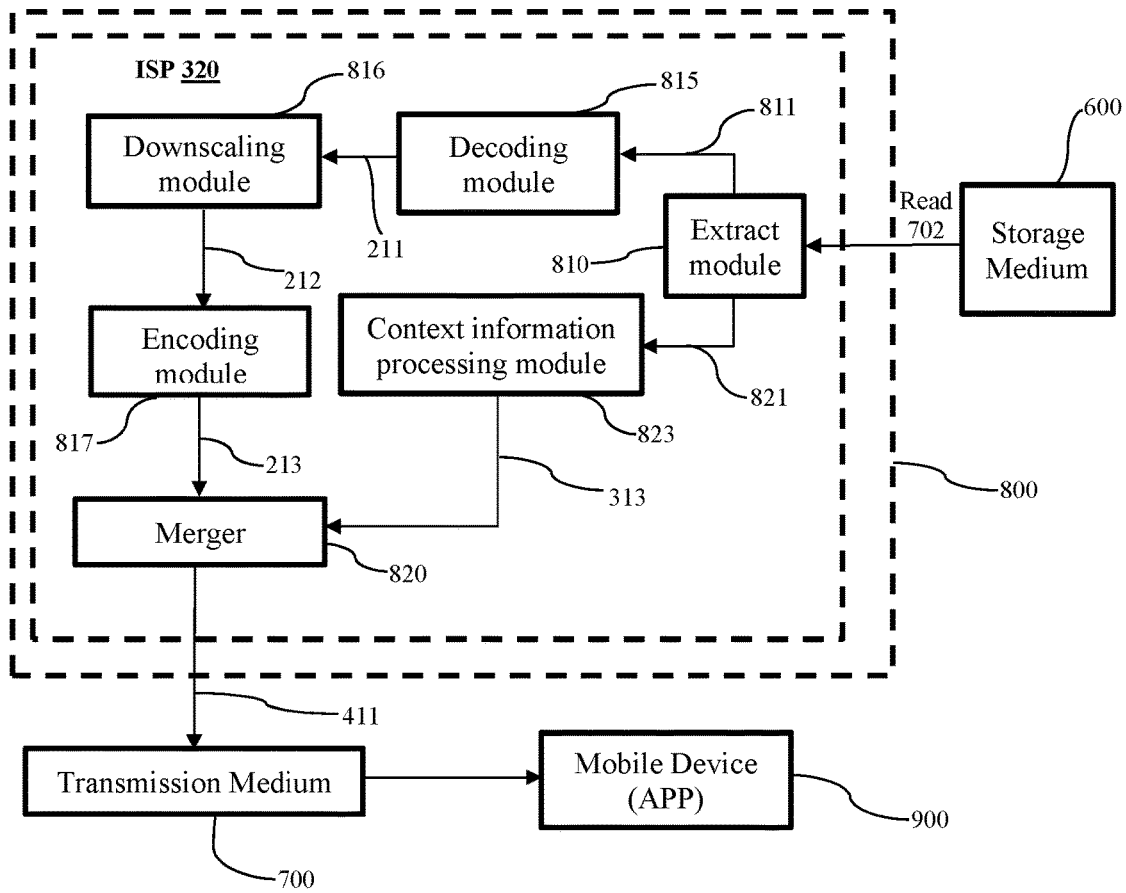
FIG. 14 is another exemplary block diagram illustrating another alternative embodiment of the imaging system of FIG. 12, wherein the imaging system includes an ISP for processing a video content and context information of the video clip separately, and a merger for merging the video content with the context information for transmitting to a remote device.

FIG. 14 illustrates an alternative embodiment of the exemplary imaging system 200. Turning to FIG. 14, the imaging device 800 is shown including an ISP 320 to process video content and context information of a video clip separately. The ISP 320 can transcode the video content of the video clip stored in a storage media 600 and can merge the video content with processed context information for transmitting to a remote device 900. The storage medium 600 can be any storage device for storing video clips, including but not limited to, a secure digital card ("SD"), an embedded multimedia card ("eMMC"), a solid state drive ("SSD"), a USB disk, or any other type of mobile disks, and the like. The storage medium 600 can comprise any storage medium that can be accessed by the ISP 320.

The video clip can comprise one or more images captured by the imaging device 800 and can contain both video content and context information, such as audio content and/or other metadata. The metadata can include, but is not limited to, automatically collected video metadata, such as aperture, shutter speed, location coordinates, GPS coordinates and the like, and manual written information, such as transcripts of dialogue or conversations and other text descriptions.

In the manner described above with reference to the storage medium 600 of FIG. 12, the storage medium 600 can be attached and/or be communicatively associated with the imaging device 800. The imaging device 800 can be any type of imaging device as shown and described with reference to FIG. 12. The imaging device 800 can be associated with an imaging processor that can comprise one or more processors that operate, individually or collectively, to perform the functionalities described herein. As shown in FIG. 14, the imaging processor is shown as being the ISP 320. In some embodiments, the imaging device 800 can perform a plurality of imaging functions. For example, the imaging device 800 can capture still images or moving images (or video clips). Additionally and/or alternatively, the ISP 320 or the imaging device 800 can facilitate transmission of the video clips, such as the video clips stored in the storage medium 600.

When transmitting a selected video clip, the ISP 320 can retrieve the selected video clip from the storage medium 600 by read 702. The video clip can be read into the ISP 320 as a document, partially or in its entirety, or as a bitstream. The ISP 320 can execute a software program, such as an extract module 810, to separate video content of the video clip from context information of the video clip. The video content of the video clip can be in a form of video content 811 that can be passed to a decoding module 815. The video content 811 can be in a format of a bitstream or a file.

The decoding module 815 can be a software program that is executed by the ISP 320 or can include hardware, software, firmware or a combination thereof. The decoding module 815 can decode the video content 811 according to a predetermined protocol. In some embodiments, the predetermined protocol can be the same protocol that was used to encode the video content. The decoding module 815 can decode the video content 811 to generate a first video bitstream 211. The first video bitstream 211 can be passed to a downscaling module 816.

The downscaling module 816 can be a software program that is executed by the ISP 320 or can include hardware, software, firmware or a combination thereof. The downscaling module 816 can downscale the first video bitstream 211 to generate a second video bitstream 212. The downscaling module 816 can downscale the first video bitstream 211 by reducing a bitrate and/or bit per second rate of the first video bitstream 211. The bitrate of the first video bitstream 211 can be reduced by either reducing a resolution of the first video bitstream 211 and/or by reducing a sampling rate or a frame per second rate of the first video bitstream 211. The second video bitstream 212 can be passed to an encoding module 817.

The encoding module 817 can be a software program that is executed by the ISP 320 or can include hardware, software, firmware or a combination thereof. The encoding module 817 can encode the second video bitstream 212 to generate a third video bitstream 213. The encoding module 817 can encode the second video bitstream 212 in accordance with a protocol that is compatible to a remote device 900 and/or an APP running on the remote device 900. Such protocols can include, but are not limited to, a 3rd Generation Partnership Project ("3GPP"), Motion Picture Experts Group ("MPEG4"), Real Time Streaming Protocol ("RTSP"), Flash Lite, Mobiclip and the like. The third video bitstream 213 can have a much lower bit per second rate than the first video bitstream 211 due to the downscaling. The third video bitstream 213 can be passed to a merger 820.

The merger 820 can be a software program that is executed by the ISP 320 or can include hardware, software, firmware or a combination thereof. The merger 820 can merge the third video bitstream 213 with context information in a form of an auxiliary context bitstream 313, of the video clip to generate a composite bitstream 411. When merging the third video bitstream 213 with the auxiliary context bitstream 313, the merger 820 can synchronize the third video bitstream 213 with the auxiliary context bitstream 313 by matching timestamps distributed along both bitstreams 213, 313 in a manner shown and described with reference to FIG. 9.

Although shown and described as using timestamps for purposes of illustration only, the third video bitstream 213 and the auxiliary context bitstream 313 can be synchronized with any other form of matching marks, such as a packet label. Although shown and described as being a software program being executed by the ISP 320 for purposes of illustration only, the merger 820 can be a separate processing module that is independent from the imaging device 800.

The composite bitstream 411 can be transmitted to the remote device 900 via a transmission medium 700. The transmission medium 700 can be any type of wired and/or wireless communication connection, or any type of network connections. The APP installed on the remote device 900 can be used to present the video clip by presenting the composite bitstream 411 while the encoded video bitstream 411 is being transmitted.

Although shown and described as presenting the composite bitstream 411 with the APP running on the remote device 900 for purposes of illustration only, the composite bitstream 411 can be presented with any suitable viewers, such as any applicable video viewers running with any hardware, firmware, or a combination of hardware and firmware.

Figure 15:
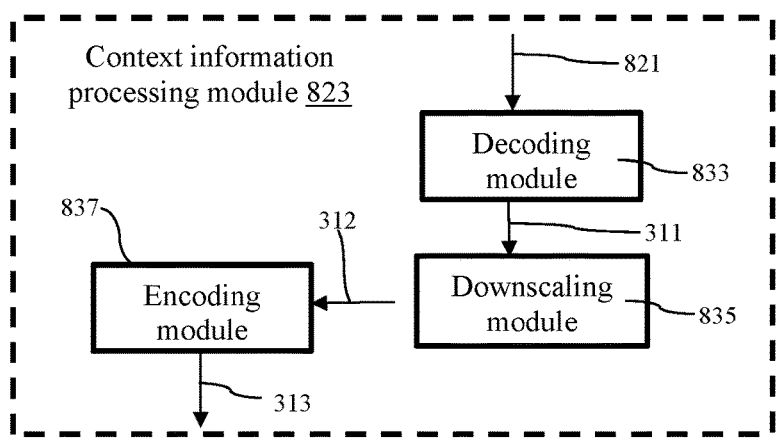
FIG. 15 is another exemplary block diagram illustrating an alternative embodiment of the imaging system of FIG. 14, wherein the context information processing module decodes, downscales and encodes the context information.

FIG. 15 illustrates an alternative embodiment of the imaging system 200. Turning to FIG. 15, an exemplary context information processing module 823 is shown. In the manner set forth above, the context information processing module 823 can transcode the context information. The context information processing module 823 of FIG. 15 is shown as receiving the context content 821 and including a decoding module 833, a downscaling module 835 and an encoding module 837. In FIG. 15, the context information of the video clip can be in a form of context content 821 that can either be a bitstream or a file.

The context content 821 can be passed to the decoding module 833. The decoding module 833 can be a software program that is executed by the ISP 320 or can include hardware, software, firmware or a combination thereof. The decoding module 833 can decode the context content 821 according to a predetermined protocol. In some embodiments, the predetermined protocol can be the same with the protocol used to encode the context information. The decoding module 833 can decode the context content 821 to generate first context bitstream 311. The first context bitstream 311 can be passed to the downscaling module 835.

The downscaling module 835 can be a software program that is executed by the ISP 320 or can include hardware, software, firmware or a combination thereof. The downscaling module 835 can downscale the first context bitstream 311 to generate a second context bitstream 312. The downscaling module 835 can downscale the first context bitstream 311, for example, by reducing a bit per second rate of the first context bitstream 311. The second context bitstream 312 can be passed to the encoding module 837.

The encoding module 837 can be a software program that is executed by the ISP 320 or can include hardware, software, firmware or a combination thereof. The encoding module 837 can encode the second context bitstream 312 to generate an auxiliary context bitstream 313. The encoding module 837 can encode the second context bitstream 312, for example, in accordance with a protocol that is compatible to combine with the third video bitstream 213 (shown in FIG. 14). As shown and described with reference to FIG. 14, the auxiliary context bitstream 313 can be passed to a merger 820 for merging with the third video bitstream 213.

Figure 16:
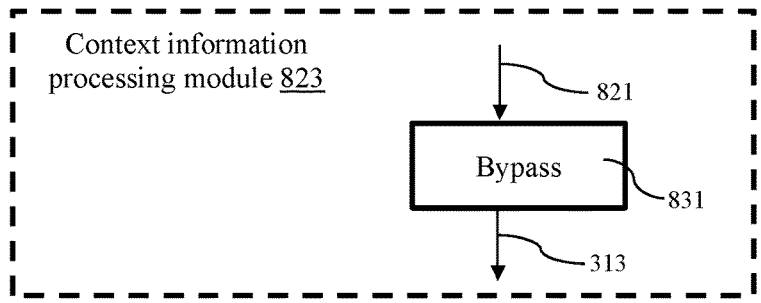
FIG. 16 is another exemplary block diagram illustrating another alternative embodiment of the system of FIG. 14, wherein the context information processing module uses a bypass for merging the context information with the transcoded video content.

FIG. 16 illustrates an alternative embodiment of the exemplary system 200. Turning to FIG. 16, the imaging system 200 is shown as including a context information processing module 823 with a bypass 831. The bypass 831 can permit the context information to circumvent the transcoding modules 833, 835, 837 (shown in FIG. 15) of the context information processing module 823. By circumventing the transcoding modules 833, 835, 837, the bypass 831 can enable the context information to be merged with the transcoded video content. As shown in FIG. 16, context content 821 can be passed to a merger 820 (shown in FIG. 14) via the bypass 831. The context content 821 thereby can comprise an auxiliary context bitstream 313 that is not transcoded.

In some embodiments, video content can comprise more volume than the context information. Therefore, a size reduction of the video content can be very helpful to facilitate a transmission via a communication connection, particularly a wireless communication connection. In contrast, a size reduction of the context information can be unnecessary. For that purpose, a transcoding operation of the context information processing module 823 can be unnecessary and thus can be bypassed via the bypass 831.

Figure 17:
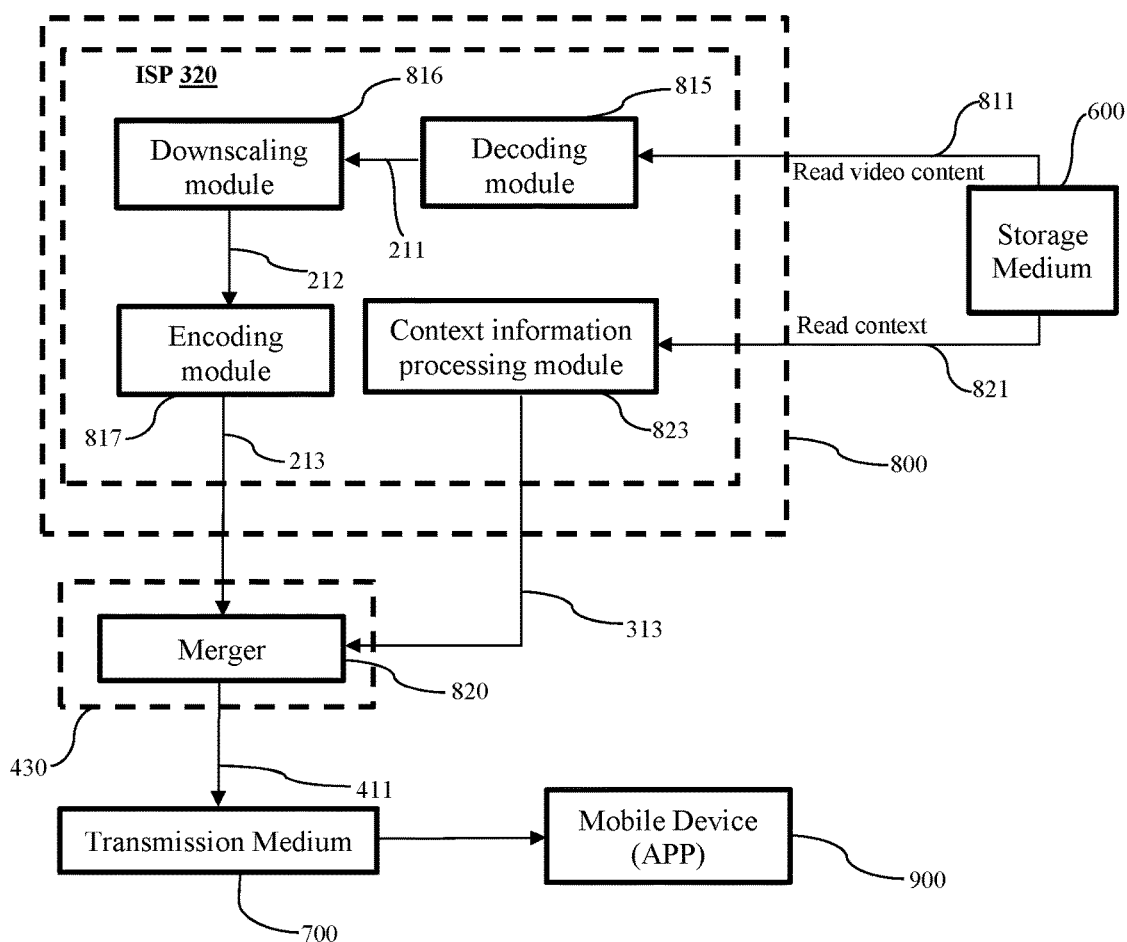
FIG. 17 is an exemplary block diagram illustrating another alternative embodiment of the system of FIG. 14, wherein the storage medium provides the context information separately from the video content source, and wherein the video content and the context information are merged externally from the imaging device.

FIG. 17 illustrates another alternative embodiment of the exemplary system 200. Turning to FIG. 17, the storage medium 600 provides the context information separately from the video content source. Alternatively and/or additionally, the video content and the context information are merged externally from the imaging device 800. In FIG. 17, the video content of the video clip can be stored in a storage medium 600. The storage medium 600 can be provided in the manner shown and described with reference to the storage medium 600 of FIG. 14. The context information can be acquired from a different channel, such from another file stored on the storage medium 600. The context information can include, but is not limited to, audio content and/or other metadata that includes, but is not limited to, automatically collected video metadata, such as aperture, shutter speed, location coordinates, GPS coordinates and the like, and manual written information, such as transcripts of dialogue or conversations and other text descriptions.

In FIG. 17, the video content of the video clip can be retrieved by an ISP 320 as video content 811. In the manner shown and described with reference to FIG. 14, the video content 811 can be transcoded to generate a third video bitstream 213. To transcode the video content 811, the ISP 320 of the imaging device 800 can execute a decoding module 815 to decode the video content 811 and to generate a first video bitstream 211. The ISP 320 can execute a downscaling module 816 to downscale the first video bitstream 211 to generate a second video bitstream 212. The ISP 320 can execute an encoding module 817 to encode the second video bitstream 212 to generate the third video bitstream 213 that can be transmitted to a merger 820.

The context information of the video clip can be contained as a file that is separated from the file containing the video content and that is stored in the storage medium 600. The ISP 320 can read the context information directly from the storage medium 600 as context content 821. The ISP 320 can execute a context information processing module 823 to process the context content 821 and to generate an auxiliary context bitstream 313 that can be transmitted to the merger 820 for merging with the third video bitstream 213. The context information processing module 823 can either transcode the context content 821 in a manner shown and described with reference to FIG. 15 or circumvent the context content 821 in a manner shown and described with reference to FIG. 16.

Although shown and described as being contained in a file stored in the storage medium 600 for purposes of illustration only, the context information can be stored in a separate storage medium or captured from a separate source, e.g., audio content from a microphone (not shown) or caption information from a keyboard (not shown), etc.

As shown in FIG. 17, the merger 820 can be a program executed by a processor 430 other than the ISP 320 of the imaging device 800. The processor 430 can be disposed on a mobile platform 901 (shown in FIG. 18) or be disposed in a terrestrial device. When the processor 430 is disposed in the terrestrial device, the processor 430 can be part of the remote device 900, i.e., the processor of the remote device 900 can perform functionalities of the merger 820.

If the merger 820 is separated from the remote device 900 as shown in FIG. 17, the merger 820 can merge the third video bitstream 213 with the auxiliary context bitstream 313 to generate a composite bitstream 411. The composite bitstream 411 can be transmitted to the remote device 900 via a selected transmission medium 700. The composite bitstream 411 can be presented via an APP of the remote device 900 in one of a plurality of modes, including, but not limited to, a display mode, a fast-forward mode and a fast-rewind mode. At least one parameter of the ISP 320 can be adjusted based on the presented information, either manually or automatically.

Although shown and described as both the video content and the context information are transmitted via the ISP 320 to the merger 820 for purposes of illustration only, the context information can be transmitted to the merger 820 from other sources, e.g., from a microphone or a keyboard etc.

FIG. 18 illustrates an embodiment of a system 300 for transmitting a video clip of FIG. 14 or FIG. 17. Turning to FIG. 18, an imaging device 800 is positioned on a mobile platform 901, which can communicate with a remote device 900. In one embodiment, the remote device 900 can comprise a terrestrial remote device. As shown in FIG. 18, the mobile platform 901 can comprise an aerial mobile platform, such as a UAV, and can provide a platform for the imaging device 800 to capture still images or moving images (or video clips) from above the ground.

The mobile platform 901 can comprise a plurality of propulsion units, e.g., propellers 911, for providing lifting power to the UAV. The mobile platform 901 can have a fuselage 910 that can couple with the imaging device 800. As shown and described herein, a storage medium 600 (shown in FIG. 14) can be attached to the imaging device 800 or communicatively associated with the imaging device 800. When the storage medium 600 is communicatively associated with an ISP 320 (shown in FIG. 14) of the imaging device 800, the storage medium 600 can be disposed at a suitable position on the mobile platform 901, e.g., on or within the body 910.

As shown and described herein, a merger 820 can be either a program executed by the ISP 320 of the imaging device 800 or be executed by a processor 430 (shown in FIG. 17) other than the ISP 320. In latter case, the processor 430 can be disposed either on the mobile platform 901 or in a terrestrial device. Stated somewhat differently, the merger 820 can be a program executed by the remote device 900. In some embodiments, a third video bitstream 213 and an auxiliary context bitstream 313 can be transmitted to remote device 900 via separate channels; so, the bitstreams 213, 313 can be merged via the remote device 900 to generate a composite bitstream 411.

The composite bitstream 411 can be presented via the remote device 900. The presented content, particularly the context information, can be used as basis to adjust configuration settings of the ISP 320, such as parameters used for transcoding the video content and/or the context information. The adjustment can be performed manually by an operator or be performed automatically by the remote device 900. The remote device 900 is shown and described for purposes of illustration only. In some embodiments, the composite bitstream 411 can be presented and/or the configuration settings can be adjusted via any suitable devices, such as a notepad, a laptop computer, a desktop computer and the like.

Although shown and described as using a merger to merge the two bitstreams 814, 822 for purposes of illustration only, the remote device 900 can adjust the configurations for transcoding based solely on the context information.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for handling video comprising:
using an imaging device of an unmanned aerial vehicle (UAV) including one or more propulsion units providing lifting power and a storage medium storing a video file to perform:
extracting video content and context information from a video file, the context information being associated with the video content;
transmitting the video content via a first communication path;
decoding the context information to generate a first context bitstream;
downscaling the first context bitstream to generate a second context bitstream;
encoding the second context bitstream to generate an auxiliary context bitstream; and
transmitting the auxiliary context bitstream via a second communication path separate from the first communication path.

2. The method of claim 1, wherein extracting the context information includes extracting at least one of audio data, caption data, environmental data, or configuration data from the video.

3. The method of claim 1, wherein downscaling the first context bitstream includes reducing a bitrate or a bit per second rate of the first context bitstream.

4. The method of claim 3, wherein reducing the bitrate includes reducing a sampling rate of the first context bitstream.

5. The method of claim 1, wherein encoding the second context bitstream includes encoding the second context bitstream with a protocol that compresses the second context bitstream.

6. The method of claim 5, wherein the protocol is recognized by an application ("APP") of a remote device receiving the auxiliary context bitstream.

7. The method of claim 1, wherein transmitting the video content further includes transcoding the video content to generate an encoded video bitstream.

8. The method of claim 7, further comprising:
merging the encoded video bitstream with the auxiliary context bitstream to generate a composite bitstream.

9. The method of claim 8, wherein merging the encoded video bitstream with the auxiliary context bitstream includes synchronizing the encoded video bitstream and the auxiliary context bitstream to generate the composite bitstream.

10. The method of claim 9, wherein synchronizing the encoded video bitstream and the auxiliary context bitstream includes matching header information of data packets of the encoded video bitstream with header information of data packets of the auxiliary context bitstream.

11. The method of claim 10, wherein matching the header information of the data packets of the encoded video bitstream with the header information of the data packets of the auxiliary context bitstream includes performing at least one of:
    matching a timestamp of the data packets of the encoded video bitstream with a timestamp of the data packets of the auxiliary context bitstream; or
    matching a serial number of the data packets of the encoded video bitstream with a serial number of the data packets of the auxiliary context bitstream.

12. The method of claim 8, further comprising:
presenting the composite bitstream via a display.

13. The method of claim 12, wherein presenting the composite bitstream includes presenting the composite bitstream with an application of a remote device.

14. The method of claim 12, wherein presenting the composite bitstream includes presenting the composite bitstream in a fast-forward mode or a fast-rewind mode.

15. The method of claim 1,
    wherein the video file is captured by an imaging device on an unmanned aerial vehicle ("UAV") and stored in a storage medium on the UAV;
    the method further comprising, before extracting the video content and the context information:
    acquiring the video file from the storage medium.

16. An Unmanned Aerial Vehicle (UAV) comprising:
one or more propulsion units providing lifting power;
a storage medium storing a video file; and
an imaging device including an imaging processor for:
    extracting video content and context information from the video file, the context information being associated with the video content;
    transmitting the video content via a first communication path;
    decoding the context information to generate a first context bitstream;
    downscaling the first context bitstream to generate a second context bitstream;
    encoding the second context bitstream to generate an auxiliary context bitstream; and
    transmitting the auxiliary context bitstream via a second communication path separate from the first communication path.

17. An imaging system for handling video comprising:
a storage medium storing a video file; and
one or more processors, individually or collectively:
    extracting video content and context information from the video file, the context information being associated with the video content;
    transmitting the video content via a first communication path;
    decoding the context information to generate a first context bitstream;
    downscaling the first context bitstream to generate a second context bitstream;
    encoding the second context bitstream to generate an auxiliary context bitstream; and
    transmitting the auxiliary context bitstream via a second communication path separate from the first communication path;
wherein the imaging system is mounted on an unmanned aerial vehicle (UAV) including one or more propulsion units providing lifting power.

* * * * *